Aug. 11, 1942.  W. H. JOHNSON  2,292,759
TORQUE LIMITING DEVICE
Filed Dec. 8, 1939  2 Sheets-Sheet 1

INVENTOR
William Horace Johnson
BY
Albert M. Austin
ATTORNEY

Aug. 11, 1942.  W. H. JOHNSON  2,292,759
TORQUE LIMITING DEVICE
Filed Dec. 8, 1939   2 Sheets-Sheet 2

INVENTOR
William Horace Johnson
BY
Albert M. Austin
ATTORNEY

Patented Aug. 11, 1942

2,292,759

UNITED STATES PATENT OFFICE 2,292,759

TORQUE LIMITING DEVICE

William Horace Johnson, Cranston, R. I., assignor to Weskenson Corporation, Providence, R. I., a corporation of Rhode Island Application December 8, 1939, Serial No. 308,109

2 Claims. (Cl. 64—29)

The invention relates to torque limiting devices and more particularly to torque limiting devices automatically reconnectable when the excess torque is removed.

According to a preferred form of the invention, the torque limiting device consists of a spring-pressed driving plate having a series of grooves in its driving face. The driven element comprises a holder plate having a series of rollers cooperating with said grooves. When a predetermined torque is exceeded, the rollers act against the tapered edges of the grooves, overcoming the axial thrust of the spring and disconnecting the drive. As soon as the excess torque is removed, the spring overcomes the force exerted by the rollers and driving action is resumed.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a vertical section taken on the line 1—1 of Fig. 6;

Figure 1:
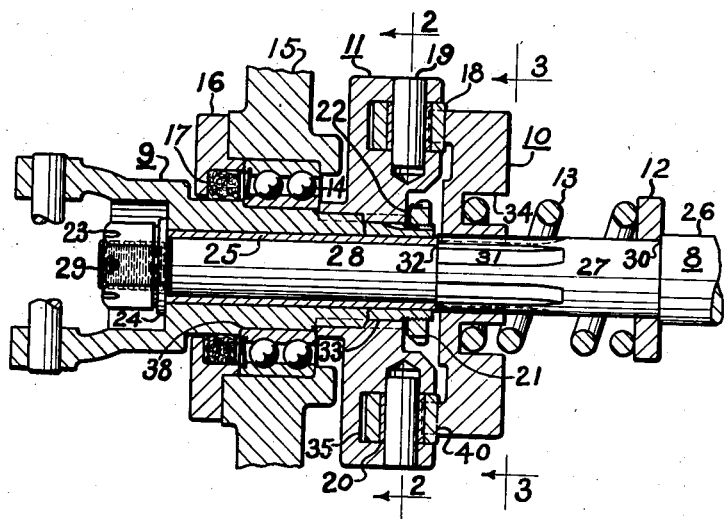
Figure 2:
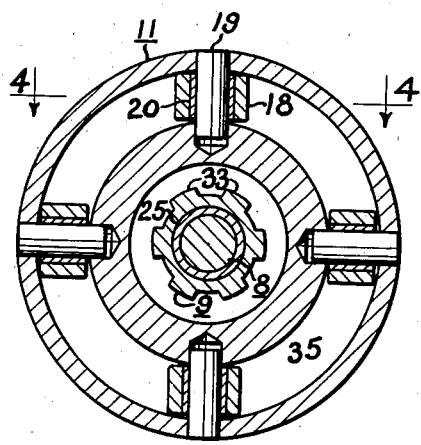
Fig. 2 is a vertical section taken on the line 2—2 of Fig. 1.
Figure 3:
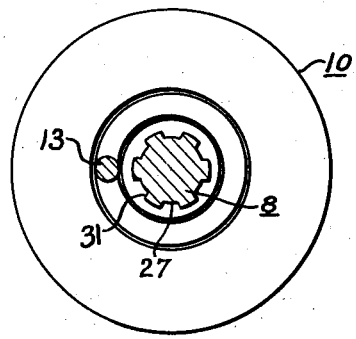
Fig. 3 is a vertical section taken on the line 3—3 of Fig. 1.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosures of the invention is made for purposes of explanation, but it will be understood that the details may be modified in various respects without departure from the broad aspect of the invention.

The torque limiting device has a drive shaft 8, which may be a part of, or connected to, any power transmitting mechanism (not shown) and a driven shaft or unit 9 which may be connected to any driven mechanism. In this case the unit 9 is shown as a part of a universal joint. The torque limiting device is shown as journalled in case 15.

The driving shaft 8 has three sections, 26, 27 and 28, and a threaded end 29. Section 26 is the main part of the shaft. Section 27 is smaller in diameter than section 26 and forms a shoulder 30. On this section are splines 31 on which is mounted the axially slidable driving member 10. Section 28 is smaller in diameter than section 27 and forms a shoulder 32. On this section is mounted the bushing 25 which is held against shoulder 32 by collar 24 and castled nut 23. Cotter pin 36 prevents nut 23 from loosening. Bushing 25 is longer than section 28 so that it may be tightly clamped between shoulder 32 and nut 23 and is thus fast on shaft 8.

The connecting unit 9 is mounted on, and free to revolve on, bushing 25 and is held axially by collar 24 and shoulder 32 and is slightly shorter than bushing 25 for freedom of rotation. On the outside at its inner end are splines 33 upon which is mounted the driven holder member 11. On the outside of connecting unit 9 is also mounted an anti-friction bearing 14. Both the inner race of bearing 14 and driven member 11 are held axially on unit 9 against shoulder 38 by nut 21 and lock washer 22.

Figure 4:
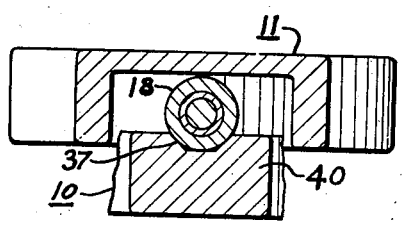
Fig. 4 is a horizontal section taken on the line 4—4 of Fig. 2.
Figure 5:
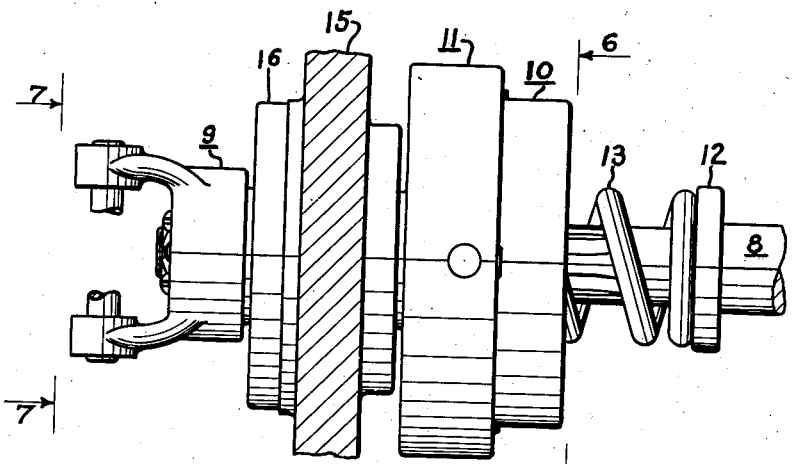
Fig. 5 is a front elevation of the device.
Figure 6:
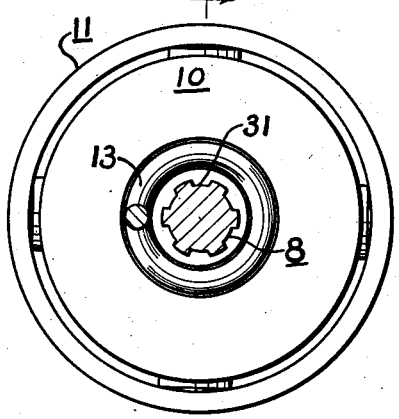
Fig. 6 is a vertical section taken on the line 6—6 of Fig. 5.
Figure 7:
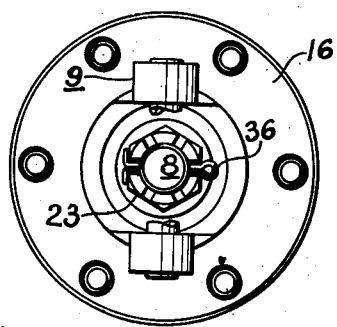
Fig. 7 is an end elevation taken on the line 7—7 of Fig. 5.

The driving clutch plate 10 is slidable axially on splines 31 on section 27 of shaft 8 and has an annular spring groove or pocket 34. It also has beveled radial grooves 37 (Fig. 4) which fit over rollers 18 on driven member 11. The driven clutch or holder member 11 has an annular recess 35 and carries radial roller pins 19 on which are journalled rollers 18. The recess 35 also allows the entrance of outer rim 40 of driving member 10 where it fits over the rollers. The driving rollers 18 are lined with bushings 20 fixedly secured thereto and the pins 19 are fixed to holder 11.

The spring 13 is mounted in groove 34 of driving member 10 and thrusts against collar 12 mounted on section 27 of shaft 8 and held against shoulder 30. Its action forces the driving plate 10 against the rollers 18 on driven holder member 11 for driving purposes. This spring may be of any desired size and strength to withstand any desired torque. The strength of this spring governs the point at which the device breaks connection.

The anti-friction bearing 14 may be either ball or roller type. Its outer race is fitted in case 15 and held in place by retainer ring 16. The retainer collar 16 contains an oil seal 17 and is fastened to case 15 by suitable screws (not shown).

The case 15 is shown in part only. It may be of any shape or size to hold the power transmitting mechanism (not shown). The torque limiting device, as illustrated, is supported at its outer end only by bearing 14. The inner end may be supported by a separate bearing or by the driving mechanism, as may be desired.

The device operates as follows:

The driving device, such as a variable speed transmission (not shown) is connected to driving shaft 8 and the driven device, such as the drive wheels of an automobile (not shown), is connected to universal unit 9, and torque is transmitted through the torque limiting device. For torques less than the predetermined critical value, the axial pressure exerted by spring 13 is sufficient to overcome the axial component of the forces due to the driving torque exerted by the rollers 18 on the tapered side walls of notches 37. When this predetermined torque is exceeded, as for example, when the load on driven unit 9 becomes excessive, the force due to the rolls 18 on the bevel sides of grooves 37 overcomes spring 13, causing plate 10 to slide axially on shaft 8, breaking the driving connection. Thus driving plate 10 will continue to rotate with respect to holder plate 11, with the rollers 18 rolling on flange 40 until the torque is reduced below the predetermined critical value at which point the force exerted on spring 13 is sufficient to overcome the force exerted by rollers 18 against the bevel sides of notches 37.

It will be understood that, normally, when the torque is below the critical value, the torque limiting device rotates as a unit with no relative movement between the parts. When the allowable torque is exceeded, the drive shaft 8 and drive plate 10 rotate with respect to driven sleeve shaft and holder plate 11, the bushing 25 providing a radial bearing for sleeve 9 and collar 24 and nut 23 providing a thrust bearing for sleeve 9.

It will be understood that the notched plate 10 may be axially fixed and the holder plate 11 axially spring-pressed, if desired. Furthermore, the driving device may be attached to unit 9 and the load attached to shaft 8, if desired.

The device is simple and rugged and cannot easily get out of order. It provides protection against sudden shocks and also against excessive torques of a more constant nature, such as obtained when used with transmissions having high gear ratio where torques may reach almost infinite values with consequent destructive effects on the transmission and related drive shafts. The device is superior to ordinary shear pins and the like since the drive connection is automatically restored when the excessive torque is removed without any special attention. The parts are so designed that, even though the excessive torque continues for long periods, relative slipping movement between driving clutch plate 10 and driven clutch plate 11 cannot cause excessive wear on the torque limiter. The device is entirely self-contained, exerting no forces on the mechanisms to which it is connected.

While certain novel features of the invention have been disclosed and are pointed out in the annexed claims, it will be understood that various omissions, substitutions and changes may be made by those skilled in the art without departing from the spirit of the invention.

What is claimed is:

1. In a torque limiting device, an inner shaft having spaced first and second end abutments and an intermediate abutment, a sleeve journaled on said shaft between said first and intermediate abutments, a first plate-like clutch element affixed to the inner end of said sleeve, a second plate-like clutch element feathered-keyed to said inner shaft, a helical spring surrounding said inner shaft and disposed between said second clutch element and said second end abutment, one of said clutch elements having spaced, annular, axially extending flanges separated by an annular groove, stud shafts anchored in said flanges, rollers on said shafts located in said annular groove, the other clutch element having axially facing grooves whose side walls are beveled and engage said rollers under pressure of said spring.

2. In a torque limiting device, an inner shaft having spaced first and second end abutments and an intermediate abutment, a sleeve journaled on said shaft between said first and intermediate abutments, a first plate-like clutch element affixed to the inner end of said sleeve, a second plate-like clutch element feathered-keyed to said inner shaft, a helical spring surrounding said inner shaft and disposed between said second clutch element and said second end abutment, rollers journaled on one of said plate-like clutch elements, said other plate-like clutch element having axially facing grooves held in releasable engagement with said rollers by said spring, said inner shaft passing through and extending substantially the entire length of said device, said inner shaft and said sleeve having parts projecting from opposite ends of said device for connection in the length of a power-transmitting line, and a stationary bearing surrounding and journaling said sleeve.

WILLIAM HORACE JOHNSON.